US012429195B2

(12) United States Patent
Chen et al.

(10) Patent No.: US 12,429,195 B2
(45) Date of Patent: Sep. 30, 2025

(54) INDUSTRIAL AND MINING LAMP WITH LINKAGE ADJUSTMENT OF MULTIPLE MODULE ANGLES AND IMPLEMENTATION METHOD THEREOF

(71) Applicant: Hengdian Group Tospo Lighting Co., Ltd., Zhejiang (CN)

(72) Inventors: Xinping Chen, Jinhua (CN); Meiling Jin, Jinhua (CN); Jiangen Wei, Jinhua (CN); Jinbiao Cai, Jinhua (CN); Binqiang Wu, Jinhua (CN)

(73) Assignee: Hengdian Group Tospo Lighting Co., Ltd., Jinhua (CN)

( * ) Notice: Subject to any disclaimer, the term of this patent is extended or adjusted under 35 U.S.C. 154(b) by 0 days.

(21) Appl. No.: 18/807,762

(22) Filed: Aug. 16, 2024

(65) Prior Publication Data

US 2025/0093017 A1 Mar. 20, 2025

(30) Foreign Application Priority Data

Sep. 18, 2023 (CN) ......................... 202311204235.8

(51) Int. Cl.
*F21V 19/02* (2006.01)
*F21S 8/06* (2006.01)
*F21V 14/02* (2006.01)
*F21V 21/30* (2006.01)
*F21V 29/70* (2015.01)

(52) U.S. Cl.
CPC ................ *F21V 19/02* (2013.01); *F21S 8/06* (2013.01); *F21V 29/70* (2015.01); *F21V 14/02* (2013.01); *F21V 14/025* (2013.01); *F21V 21/30* (2013.01)

(58) Field of Classification Search
CPC .......... F21V 19/02; F21V 29/70; F21V 14/02; F21V 14/025; F21V 21/30; F21V 17/02; F21S 8/06
See application file for complete search history.

(56) References Cited

U.S. PATENT DOCUMENTS 11,221,132 B1 * 1/2022 Ding ....................... F21V 23/06
2005/0265024 A1 * 12/2005 Luk ......................... F21V 19/02
362/231

(Continued)

FOREIGN PATENT DOCUMENTS

CN 114151752 A * 3/2022
CN 219693124 U * 9/2023

*Primary Examiner* — Zheng Song
*Assistant Examiner* — James M Endo
(74) *Attorney, Agent, or Firm* — LOZA & LOZA, LLP; Michael Fedrick

(57) ABSTRACT

A high bay light with linkage adjustment of an angle of modules is disclosed, including a mounting shaft and a plurality of linkage lamp bodies in an annular array, where a mounting member is connected to a top of the mounting shaft, and a rotating shaft is connected to an inner end of the linkage lamp body; a plurality of rotating grooves are arranged on a circumference of a lower end of the mounting shaft, and the plurality of linkage lamp bodies are hinged to the mounting shaft through the cooperation between the rotating shafts and the rotating grooves; a linkage cover is slideably provided outside the mounting shaft, and an outer side of an upper end of the linkage lamp body is connected to the linkage cover through a connecting shaft.

10 Claims, 5 Drawing Sheets

(56) References Cited

U.S. PATENT DOCUMENTS

| | | | | |
|---|---|---|---|---|
| 2011/0286226 | A1* | 11/2011 | Van Horn | F21V 21/30 362/427 |
| 2013/0010464 | A1* | 1/2013 | Shuja | F21V 29/00 362/249.02 |
| 2015/0253488 | A1* | 9/2015 | Wilcox | G02B 6/305 362/619 |
| 2020/0318825 | A1* | 10/2020 | Jiang | F21V 29/508 |

* cited by examiner

INDUSTRIAL AND MINING LAMP WITH LINKAGE ADJUSTMENT OF MULTIPLE MODULE ANGLES AND IMPLEMENTATION METHOD THEREOF

CROSS-REFERENCE TO RELATED APPLICATION

This Application claims priority to Chinese patent application No. 202311204235.8, filed Sep. 18, 2023, the entirety of which are herein incorporated by reference.

TECHNICAL FIELD

The present disclosure belongs to the technical field of high bay lights, and particularly relates to a high bay light with linkage adjustment of an angle of modules and an implementation method thereof.

BACKGROUND

High bay lights are widely used in high-ceiling environments such as factories, large supermarkets, and warehouses. They are chosen by many consumers due to their professional lighting effects. Currently, traditional methods include directional lighting. High bay lights achieve a wide angle of light emission and collect light through PC reflectors or aluminum reflectors, belonging to floodlighting. The number of lamps in the area is designed according to the hanging height and ground illumination requirements.

There are two main mounting methods for high bay light products in actual use, i.e., hanging chain mounting and boom mounting. Since neither of the two mounting methods can fix a direction of the lamp after mounting, the high bay light products on the market always have a circular structure, ensuring that the light-emitting effect is not affected in any direction after mounting. As a result, the light-emitting angle of the high bay lights can only be adjusted by adding a reflector and a zoom lens and is impossible to be arbitrarily adjusted.

SUMMARY

An object of the present disclosure is to provide a high bay light with linkage adjustment of an angle of modules to solve the above-mentioned problem in the background. The high bay light with linkage adjustment of an angle of modules provided by the present disclosure has the features of facilitating the adjustment of the light-emitting angle of the high bay light and ensuring the consistency of light-emitting directions.

Another object of the present disclosure is to provide an implementation method of the high bay light with linkage adjustment of an angle of modules.

In order to achieve the above-mentioned object, the present disclosure provides the following technical solutions. A high bay light with linkage adjustment of an angle of modules is provided, including a mounting shaft and a plurality of linkage lamp bodies in an annular array, where a mounting member is connected to a top of the mounting shaft, and a rotating shaft is connected to an inner end of the linkage lamp body; a plurality of rotating grooves are arranged on a circumference of a lower end of the mounting shaft, and the plurality of linkage lamp bodies are hinged to the mounting shaft through the cooperation between the rotating shafts and the rotating grooves; a linkage cover is slideably provided outside the mounting shaft, and an outer side of an upper end of the linkage lamp body is connected to the linkage cover through a connecting shaft.

Further, for mounting the connecting shafts, connecting grooves corresponding to the connecting shafts are arranged on the linkage cover.

Further, in order to enable the linkage cover to be adjusted up and down, a plurality of positioning holes are arranged on circumferences of the mounting shaft from top to bottom, a positioning elastic sheet is connected to an upper end of the linkage cover, and a positioning nut is provided on the positioning elastic sheet.

Further, in order to facilitate quick adjustment of the linkage lamp body to a desired angle, the circumferences of the mounting shaft are provided with indication marks on a side of the positioning holes.

Further, in order to facilitate the connection between the linkage lamp body and the mounting shaft, a cover plate is connected to the bottom of the mounting shaft.

Further, in order to provide a light source, the linkage lamp body includes a heat dissipation housing, a light source plate connected to a lower surface of the heat dissipation housing, and a lens connected below the heat dissipation housing.

Further, the mounting member includes a connecting seat, a hook is rotatably provided on the connecting seat, and an elastic buckle is connected to an opening of the hook, such that the hook may be rotated to a horizontal direction to reduce the package height, increase the number of lights packaged in a container, and reduce the transportation cost.

Further, in order to prevent abrasion with the lamp body due to vibration during transportation, an elastic sheet is connected to a side surface of the connecting seat.

Further, in order to realize the effect that the lamp lights up when people come and turns off when people leave and to realize the intelligent control of the high bay light, an inductor is mounted to the lower end of the mounting shaft.

Further, in the present disclosure, an implementation method of the high bay light with linkage adjustment of an angle of modules includes the following steps:

(1), placing a connecting shaft into a connecting groove, and then realizing the connection between the connecting shaft and a linkage lamp body through a screw;

(2), sleeving a linkage cover on the outside of a mounting shaft so that a rotating shaft of the linkage lamp body is located in a rotating groove;

(3), mounting a cover plate on the mounting shaft; and (4), moving the linkage cover to a desired position, screwing a positioning nut so that the positioning nut is engaged with a positioning hole to complete the fixing of the linkage cover.

Compared with the prior art, the beneficial effects of the present disclosure are as follows.

1. In the present disclosure, by adjusting a position of the linkage cover up and down, an angle of the linkage lamp bodies may be adjusted, thereby realizing the adjustment of a light-emitting angle, and a plurality of linkage lamp bodies are synchronously linked to ensure the consistency of light-emitting directions.
2. The mounting member of the present disclosure includes the connecting seat, the hook is rotatably provided on the connecting seat, and the elastic buckle is connected to the opening of the hook. The hook may be rotated to a horizontal direction during transportation, thereby reducing the package height, increasing the number of lights packaged in a container, and reducing the transportation cost.

3. The elastic sheet is connected to the side surface of the connecting seat of the present disclosure. When the hook is rotated to the horizontal direction, it is limited by the elastic sheet to prevent abrasion between the hook and the lamp body due to vibration during transportation.
4. The inductor is mounted to the lower end of the mounting shaft of the present disclosure to realize the effect that the lamp lights up when people come and turns off when people leave and to realize the intelligent control of the high bay light.

Figure 1:
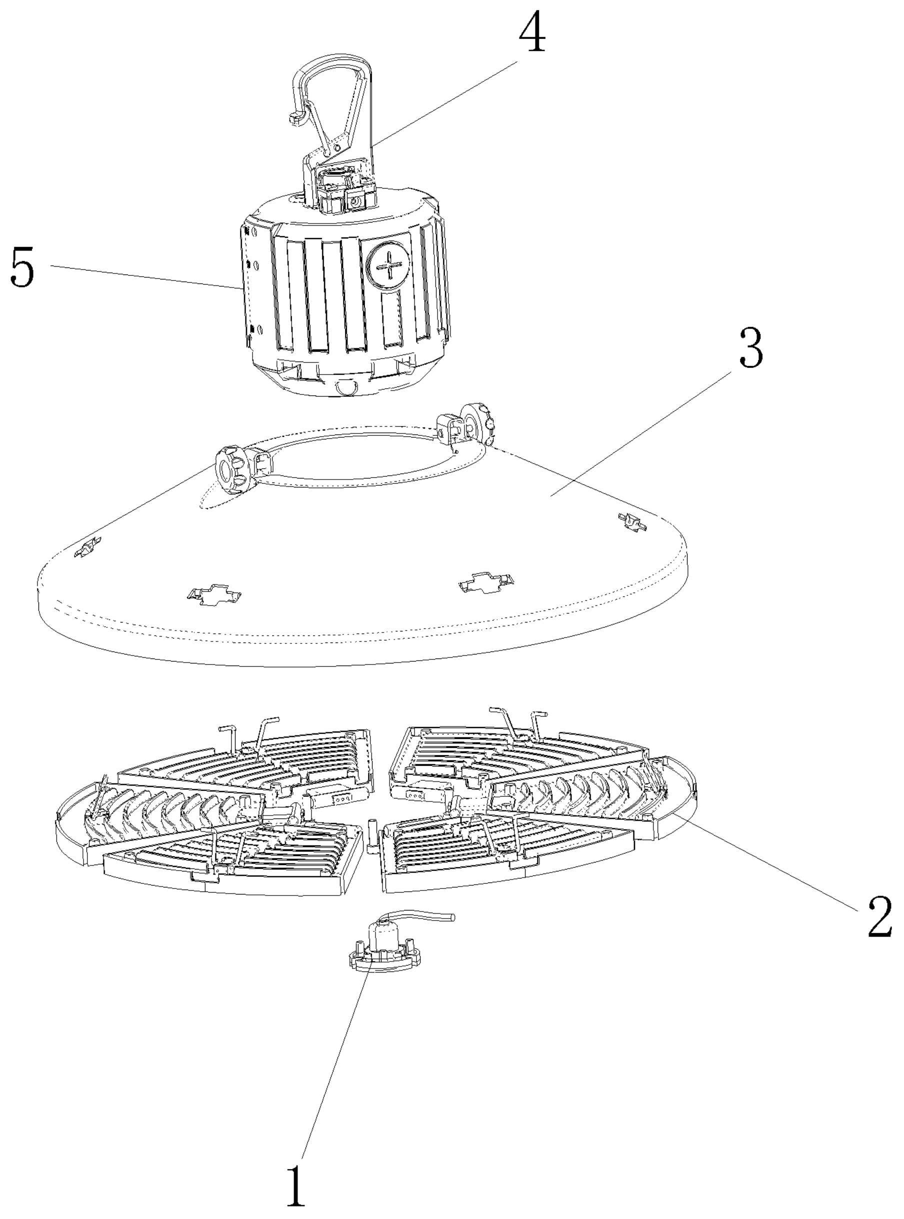
FIG. 1 is an exploded view of a structure according to the present disclosure.

In the drawings, 1—inductor; 2—linkage lamp body; 21—heat dissipation housing; 22—connecting shaft; 23—light source plate; 24—lens; 3—linkage cover; 31—connecting groove; 32—positioning elastic sheet; 33—positioning nut; 4—mounting member; 41—hook; 42—connecting seat; 43—elastic sheet; 44—elastic buckle; 5—mounting shaft; 51—rotating groove; 52—positioning hole; 53—cover plate; 54—indication mark; and 6—rotating shaft.

DETAILED DESCRIPTION OF THE EMBODIMENTS

The technical solutions in the embodiments of the present disclosure will be clearly and completely described below in conjunction with the accompanying drawings in the embodiments of the present disclosure. Obviously, the described embodiments are only some embodiments of the present disclosure, not all embodiments. Based on the embodiments of the present disclosure, all other embodiments obtained by a person skilled in the art without inventive effort fall within the scope of the present disclosure.

Embodiment 1

Figure 2:
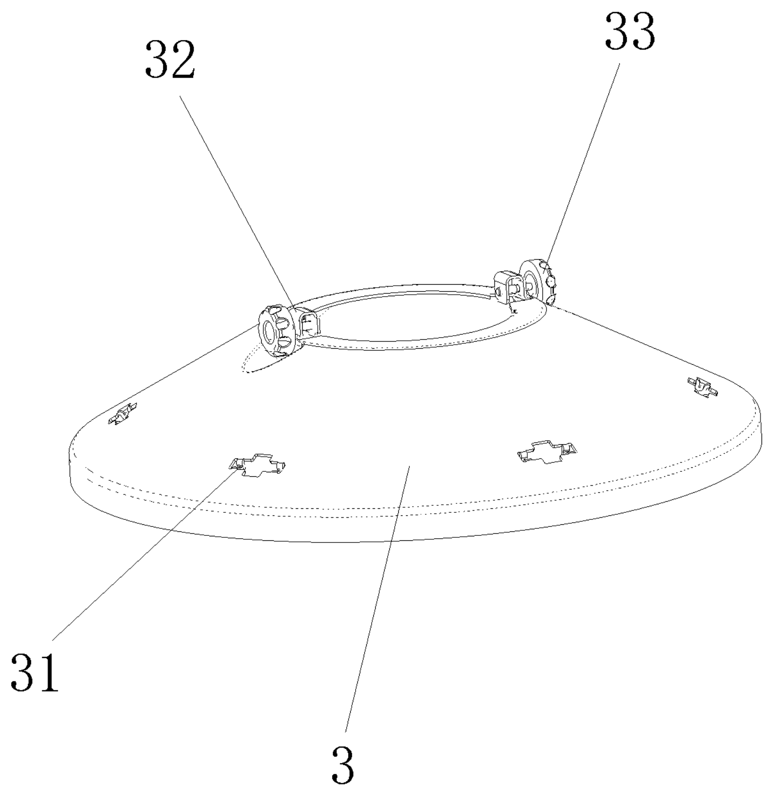
FIG. 2 is a schematic structural view of a linkage cover according to the present disclosure.
Figure 3:
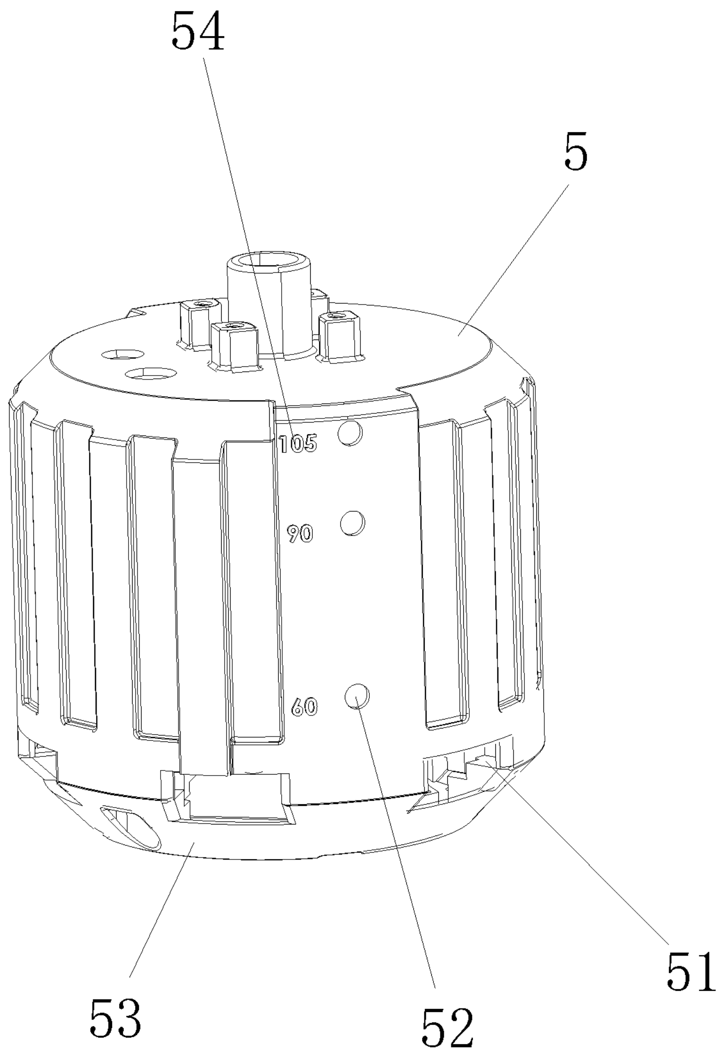
FIG. 3 is a schematic structural view of a mounting shaft according to the present disclosure.
Figure 4:
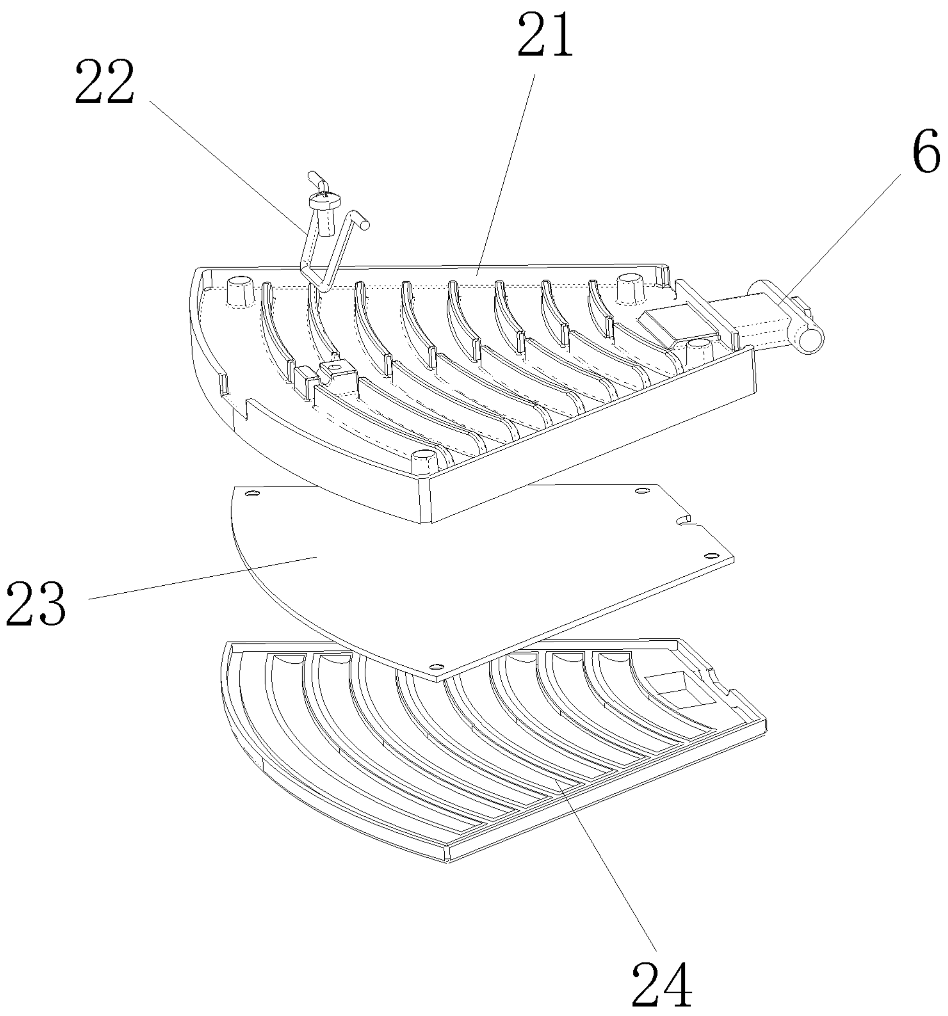
FIG. 4 is a schematic structural view of a linkage lamp body according to the present disclosure.
Figure 5:
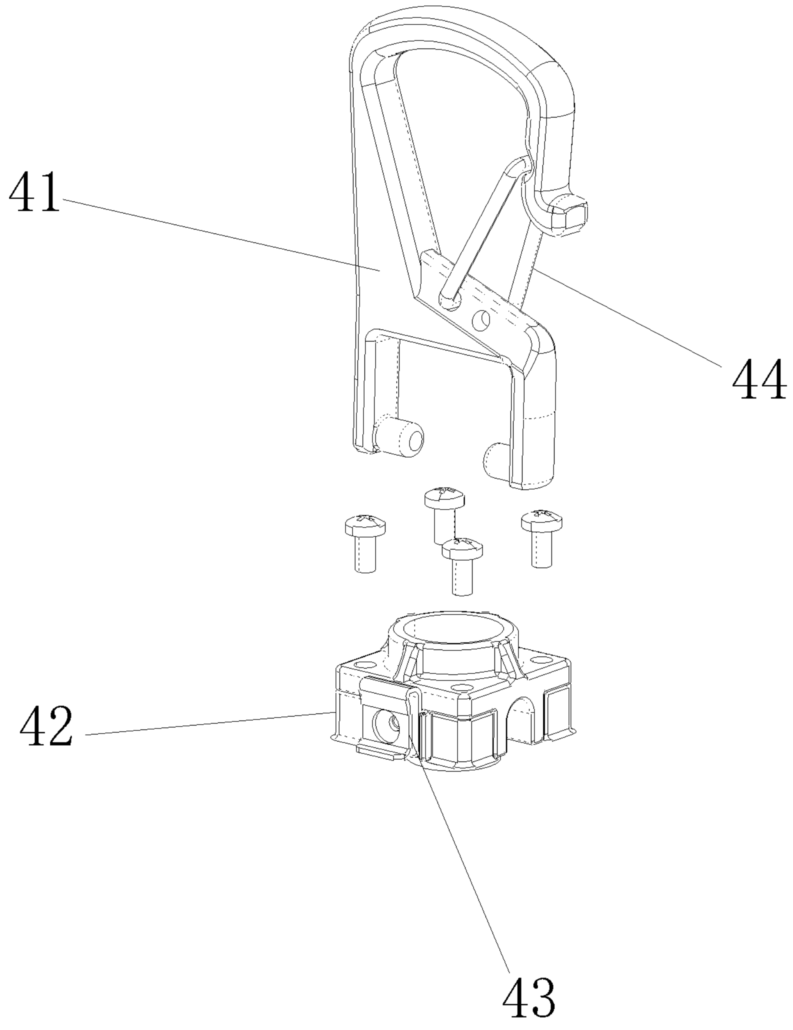
FIG. 5 is a schematic structural view of a mounting member according to the present disclosure.

Referring to FIG. 1 to FIG. 5, the present disclosure provides the following technical solutions. A high bay light with linkage adjustment of an angle of modules is provided, including a mounting shaft 5 and a plurality of linkage lamp bodies 2 in an annular array. A mounting member 4 is connected to a top of the mounting shaft 5, and a rotating shaft 6 is connected to an inner end of the linkage lamp body 2. A plurality of rotating grooves 51 are arranged on a circumference of a lower end of the mounting shaft 5, and the plurality of linkage lamp bodies 2 are hinged to the mounting shaft 5 through the cooperation between the rotating shafts 6 and the rotating grooves 51. A linkage cover 3 is slideably provided outside the mounting shaft 5, and an outer side of an upper end of the linkage lamp body 2 is connected to the linkage cover 3 through a connecting shaft 22.

By adopting the above-mentioned technical solution, in the present disclosure, by adjusting a position of the linkage cover 3 up and down, an angle of the linkage lamp body 2 may be adjusted, thereby realizing the adjustment of a light-emitting angle, and a plurality of linkage lamp bodies 2 are synchronously linked to ensure the consistency of light-emitting directions.

Specifically, connecting grooves 31 corresponding to the connecting shafts 22 are arranged on the linkage cover 3.

By adopting the above-mentioned technical solution, the connecting shaft 22 is mounted.

Specifically, a plurality of positioning holes 52 are arranged on circumferences of the mounting shaft 5 from top to bottom, positioning elastic sheets 32 are connected to an upper end of the linkage cover 3, and a positioning nut 33 is provided on the positioning elastic sheet 32.

By adopting the above-mentioned technical solution, the linkage cover 3 may be adjusted up and down.

Specifically, the circumferences of the mounting shaft 5 are provided with indication marks 54 on a side of the positioning holes 52.

By adopting the above-mentioned technical solution, it is convenient to quickly adjust the linkage lamp bodies 2 to a required angle.

Specifically, a cover plate 53 is connected to the bottom of the mounting shaft 5.

By adopting the above-mentioned technical solution, it is convenient to connect the linkage lamp bodies 2 and the mounting shaft 5.

Specifically, the linkage lamp body 2 includes a heat dissipation housing 21, a light source plate 23 connected to a lower surface of the heat dissipation housing 21, and a lens 24 connected below the heat dissipation housing 21.

By adopting the above-mentioned technical solution, a light source is provided.

Embodiment 2

The embodiment differs from embodiment 1 in that: specifically, the mounting member 4 includes a connecting seat 42, a hook 41 is rotatably provided on the connecting seat 42, and an elastic buckle 44 is connected to an opening of the hook 41.

By adopting the above-mentioned technical solution, the hook 41 may be rotated to a horizontal direction during transportation, thereby reducing the package height, increasing the number of lights packed into a container, and reducing the transportation cost.

Specifically, an elastic sheet 43 is connected to a side surface of the connecting seat 42.

By adopting the above-mentioned technical solution, when the hook 41 is rotated to the horizontal direction, it is limited by the elastic sheet 43 to prevent abrasion of the hook and the lamp bodies due to vibration during transportation.

Embodiment 3

The embodiment differs from embodiment 1 in that: specifically, an inductor 1 is mounted to a lower end of the mounting shaft 5. The inductor 1 is preferably a microwave inductor.

By adopting the above-mentioned technical solution, the effect that the light lights up when people come and turns off when people leave is realized, and the intelligent control of the high bay light is realized.

Embodiment 4

Further, an implementation method of the high bay light with linkage adjustment of an angle of modules of the present disclosure includes the following steps:

(1), placing the connecting shaft 22 into the connecting groove 31, and then realizing the connection of the connecting shaft 22 and the linkage lamp body 2 through a screw;

(2), sleeving the linkage cover 3 on the outside of the mounting shaft 5 so that the rotating shaft 6 of the linkage lamp body 2 is located in the rotating groove 51;

(3), mounting the cover plate 53 on the mounting shaft 5; and (4), moving the linkage cover 3 to a desired position, screwing the positioning nut 33 so that the positioning nut 33 is engaged with the positioning hole 52 to complete the fixing of the linkage cover 3.

In summary, in the present disclosure, by adjusting the position of the linkage cover 3 up and down, the angle of the linkage lamp bodies 2 may be adjusted, thereby realizing the adjustment of the light-emitting angle, and a plurality of linkage lamp bodies 2 are synchronously linked to ensure the consistency of light-emitting directions. The mounting member 4 of the present disclosure includes the connecting seat 42, the hook 41 is rotatably provided on the connecting seat 42, and the elastic buckle 44 is connected to the opening of the hook 41. The hook 41 may be rotated to a horizontal direction during transportation, thereby reducing the package height, increasing the number of lights packaged in a container, and reducing the transportation cost. The elastic sheet 43 is connected to the side surface of the connecting seat 42 of the present disclosure. When the hook 41 is rotated to the horizontal direction, it is limited by the elastic sheet 43 to prevent abrasion between the hook and the lamp bodies due to vibration during transportation. The inductor 1 is mounted to the lower end of the mounting shaft 5 of the present disclosure to realize the effect that the lamp lights up when people come and turns off when people leave and to realize the intelligent control of the high bay light.

While the embodiments of the present disclosure have been shown and described, it will be understood by a person skilled in the art that various changes, modifications, substitutions, and alterations may be made to these embodiments without departing from the principles and spirits of the disclosure, and the scope of the present disclosure is defined by the appended claims and their equivalents.

The invention claimed is:

1. A high bay light with linkage adjustment of an angle of modules, comprising a mounting shaft and a plurality of linkage lamp bodies in an annular array, wherein a mounting member is connected to a top of the mounting shaft, and a rotating shaft is connected to an inner end of each linkage lamp body; a plurality of rotating grooves are arranged on a circumference of a lower end of the mounting shaft, and the plurality of linkage lamp bodies are hinged to the mounting shaft through cooperation between the rotating shafts of the linkage lamp bodies and the rotating grooves; a linkage cover is slideably provided outside the mounting shaft, and an outer side of an upper end of each linkage lamp body is connected to the linkage cover through a corresponding connecting shaft.

2. The high bay light according to claim 1, wherein connecting grooves corresponding to the connecting shafts of the linkage lamp bodies are arranged on the linkage cover.

3. The high bay light according to claim 1, wherein a plurality of positioning holes are arranged on circumferences of the mounting shaft from top to bottom, a positioning elastic sheet is connected to an upper end of the linkage cover, and a positioning nut is provided on the positioning elastic sheet.

4. The high bay light according to claim 3, wherein the circumferences of the mounting shaft are provided with indication marks on a side of the positioning holes.

5. The high bay light according to claim 1, wherein a cover plate is connected to a bottom of the mounting shaft.

6. The high bay light according to claim 1, wherein each linkage lamp body comprises a heat dissipation housing, a light source plate is connected to a lower surface of the heat dissipation housing, and a lens is connected below the heat dissipation housing.

7. The high bay light according to claim 1, wherein the mounting member comprises a connecting seat, a hook is rotatably provided on the connecting seat, and an elastic buckle is connected to an opening of the hook.

8. The high bay light according to claim 7, wherein an elastic sheet is connected to a side surface of the connecting seat.

9. The high bay light according to claim 1, wherein an inductor is mounted to the lower end of the mounting shaft.

10. An implementation method of the high bay light according to claim 1, comprising the steps of:

(1) placing each connecting shaft into a corresponding one of the connecting grooves, and then connecting each connecting shaft and a corresponding one of the linkage lamp bodies through a corresponding screw;

(2) sleeving the mounting shaft with the linkage cover so that each rotating shaft of each linkage lamp body is located in a corresponding one of the rotating grooves;

(3) mounting a cover plate on the mounting shaft; and (4) moving the linkage cover to a desired position, screwing a positioning nut so that the positioning nut is engaged with a positioning hole to complete the fixing of the linkage cover.

* * * * *